United States Patent Office 3,361,684
Patented Jan. 2, 1968

3,361,684
THERMOSETTING RESIN MATRIX CONTAINING BORON COMPOUNDS OF SPECIFIC SIZE DISTRIBUTION AND METHOD OF MAKING
Theodor Chvatal, Vienna, Austria, assignor to Werner H. Kreidl, Vaduz, Liechtenstein
No Drawing. Filed Jan. 18, 1966, Ser. No. 521,407
17 Claims. (Cl. 252—478)

The invention relates to methods of producing shielding materials for protection against biologically damaging neutron radiation, and more particularly for protection against thermal neutrons.

It is known that high-speed neutrons interact with medium and with heavy-weight nuclei, whereby gamma radiation of various energy levels (hardness) is emitted, which gamma radiation again requires, for its absorption, the provision of relatively thick layers of matter. It is, however, possible to decelerate or moderate the high-speed neutrons by elastic scattering on light nuclei, whereby said high-speed neutrons are converted to slow or even to thermal neutrons which can be captured by the atoms of some specific chemical elements having a high neutron-absorption cross section. Cadmium and the rare earth metals, although being elements of high neutron absorption, emit considerable amounts of hard gamma radiation after such neutron absorption, whereas boron emits only a very feeble secondary gamma radiation, and lithium none at all.

Because of the high capture cross section of boron and lithium, these elements and their compounds have already been used successfully for making shield against detrimental neutrons. Elemental boron, however, as well as boron carbide ($B_4C$), or calcium boride ($CaB_6$), which materials would be well suited for the purpose of shielding, are very expensive. The rather widely used "Boral," which is a composition of 30% boron carbide and 70% aluminum containing about 23.5% boron, is also rather expensive. Furthermore, the aluminum contained in said "Boral" emits a hard gamma radiation.

It is an object of the present invention to provide a protective shield against neutron radiation which reduces said secondary γ-radiation to a minimum, yet may be manufactured at relatively low cost.

Other objects and advantages provided by the present invention will become evident from the following description.

The present invention uses as boron compounds comminuted particles of lithium octoborate, lithium metaborate, purified colemanite and purified pandermite, said substances being produced or treated in such a manner that they possess less than 1% of elements emitting secondary gamma radiation. To form the shield in the desired shape the comminuted particles of these substances are mixed with about 10 to 25% of a liquid synthetic resin of the thermosetting type and the mixture is then formed and hardened.

There are various kinds of interactions between the neutrons and the shield particles. Slow and thermal neutrons are captured by boron and thus stopped; however, other elements, particularly hydrogen atoms (present in the synthetic resin) reflect neutrons, which causes them to move not only in a straight line but to scatter in all directions. Thus part of the slow and thermal neutrons slip by the boron particles and will be conducted through the resin matrix by reflection and may travel through it for long distances before they are being absorbed by the surfaces of the boron containing particles, even if the concentration of boron in the shield is very high. In spite of the relatively high boron content the shield acts as a valve or sieve permitting the movement of some neutron through the entire thickness of the shield.

It has now been found that the efficiency of a shield of a given boron content with regard to its protection against neutron radiation may be greatly improved by providing a specific distribution of the boron particles in the space they occupy within the synthetic resin matrix.

Broadly speaking, the invention provides for mixing comminuted particles of at least one of the substances of lithium octoborate, lithium metaborate, purified colemanite and purified pandermite with between about 10 to 25% of a liquid synthetic resin of the thermosetting type to produce a formable mixture under the following conditions. The above mentioned comminuted substances must have less than 1% of elements emitting secondary gamma radiation and they need to be composed substantially of about 50 to 70% of a coarse portion of an average grain size of from about 1 to 3 mm., and about 30 to 50% of a fine portion of an average grain size of from about 0.01 to 0.1 mm. The mixture is then formed into the desired shape and allowed to set, whereby a grain texture of maximum capture cross section for neutrons is obtained. Particularly satisfactory results are obtained when the mixture contains a minimum of a medium portion of a grain size of from about 0.1 to 1 mm. At any rate it should contain less than 30% of this medium portion. At 20% of the medium grain size portion, the distribution of the boron in the available space is still adequate. 30% of that medium portion should be the upper limit and should be used only if further sifting is not easily possible, since at 30% the filling out of the available space with boron is already somewhat impaired.

According to a preferred embodiment of the invention, the fine portion of the powder of a grain size of from about 0.01 to 0.1 mm. is replaced, at least partly by calcium boride ($CaB_6$) which has 55 to 56% borium.

For the manufacture of the protective shield according to the present invention, a composition comprising at least one of the substances selected from the group comprising lithium octoborate, lithium metaborate, substantially pure colemanite and substantially pure pandermite; compounded with a synthetic resin, is used as neutron-absorption layer. The above substances are insoluble or only very slightly soluble in water, they have a very high neutron-absorption cross section, and, on account of the absence of any undesired foreign matter, they produce almost no secondary γ-radiation. Further, the water of crystallization present in any of the above inorganic compounds, and the organic matter (synthetic resin) both moderate high-speed neutrons to an energy level at which they are more easily captured.

Whereas lithium octoborate and lithium metaborate can be readily obtained in pure form by chemical reactions( e.g. by reacting lithium carbonate or lithium hydroxide with boric acid), colemanite and pandermite, both of which are naturally occurring minerals, must be purified for the present purpose to remove such foreign elements as silicon, aluminum, iron, manganese and sodium. The sum of such foreign elements should not be greater than about 1%, preferably not greater than 0.5%. The purification of the above minerals may readily be accomplished by combined grinding to a grain size of about 0.1 to 3 mm. and air separation (wind sifting) and subsequent washing of the granular material thus obtained. Improved purity may be accomplished by magnetic separation of the iron still present in the ground and washed material.

The choice of synthetic resins suited for compounding the above inorganic material (lithium octoborate, lithium metaborate, pure colemanite and pure pandermite) is limited by the following facts:

As these materials are all not acid-resistant or would react with acid to neutralize them, acid-hardening ureaor phenolformaldehyde resin cannot be used. Alkali-hardening resin, as described e.g. in U.S. Patent 2,441,860 (Shell Development Company) or in Canadian Patent 615,795 (Monsanto) can be used, especially if instead of sodium-hydroxide for the precondensation reaction lithium hydroxide is used and the resin for curing is not heated above 80° C. because otherwise the hydrate would be decomposed. This does not apply for lithium octoborate which contains no water in its lattice and could be heated for setting. Otherwise the decomposition of the hydrate would result in an undesired foaming and an elimination of water which is well suited for an additional moderating action of the material.

Sodium hydroxide should be avoided as sodium has some radio active isotopes, while a content of lithium is further advantageous in connection with the aim of our invention.

If using epoxy resins or polyester resins which can be cured at room temperature one has to make sure not to use heavy metal compounds but organic ones as catalysts. While epoxy resins usually are very expensive, polyester resins increase their strength on radiation, as one has to bear in mind that usually during radiation a temperature increase will occur, the use of thermoplastic resins is less advantageous although they might be used for special purposes.

Preferred synthetic resins are polyester resins, particularly highly reactive and therefore cold-hardening polyester resins, such as Polyleit SP, produced by Reichhold Chemicals.

Lithium otoborate, which is one of the substances used in accordance with the present invention, is represented by the formula $Li_2O.4B_2O_3$ and thus contains about 28% by weight of boron and 4.5% by weight of lithium. Its solubility in water is very low. For the purpose of the present invention, said lithium octoborate is compounded with about 10–20% by weight of one of the above-named synthetic resins. The carbon and hydrogen content of said resins provides for the desired moderating action. In order to improve the water-proof characteristics of structural elements made from the resulting composition, small amounts of a stearate, such as calcium stearate, can be admixed to said composition. On account of the fact that the neutron-absorption cross section of oxygen, which, apart from boron and lithium, is the only element present in $Li_2O.4B_2O_3$, is extremely low (in fact the smallest of all of the chemical elements namely 0.0000075 cm.$^2$/g.), substantially no secondary $\gamma$-radiation will originate from the composition of the present invention. Calcium, e.g. introduced by the addition of calcium stearate, does not have any undesired effect either, since isotopes of calcium with $\gamma$-radiation do not exist.

The second substance which can be used in accordance with the present invention, viz. lithium metaborate of the formula $LiBO_2.8H_2O$, the solubility of which is also very low, offers advantages which are similar to those provided by the use of lithium octoborate, the protective effect of the lithium metaborate being somewhat smaller, however, on account of the relatively low concentration of boron and lithium (5.6% and 3.6%, respectively).

The above two lithium-boron compounds are obtained in substantially pure form by synthesis, when using starting materials which are substantially free from chemical elements emitting secondary $\gamma$-radiation upon neutron absorption. The naturally occurring minerals colemanite and pandermite, the main constituents of which are calcium borates of the formulae $Ca_2B_6O_{11}.5H_2O$ and $Ca_4B_{10}O_{19}.7H_2O$, respectively, however, contain elements, which upon neutron absorption, emit secondary $\gamma$-radiation. Such elements are silicon, iron, aluminum, sodium and manganese. Calcium, which is also contained in said minerals does not produce any such secondary radiation. The above impurities are present in said minerals, in the form of clay or tuff, between the crystallites of the calciumborate. They can readily be removed by combined distintegration and air separation. Any remaining impurities, such as sodium sulfate and gypsum can be removed by washing or flotation. It is thus possible to increase the $B_2O_3$-content of said minerals from about 39–42% to about 44–47%, whereby the protective action of such material is increased by about 10%. At the same time, the formation of any secondary $\gamma$-radiation is prevented by such purification. The hydrogen of the water of crystallization contained in said minerals has a positive effect in increasing the moderating action of the borates.

Thus, all and any of the substances used in accordance with the present invention for the production of radiation shields, will most efficiently capture thermal neutrons on account of the fact that the concentration of atoms having high capture cross section is very high and on account of the fact that the secondary $\gamma$-radiation originating from foreign elements is very low due to the low concentration of said foreign elements.

The mass obtained by mixing any of the above inorganic materials and the synthetic resin can be moulded to form bodies of any desired shape, such as slabs or plates. If desired, said mass can also be used for coating or lining bodies or structures of various other shield materials, such as heavy concrete steel or the like, said coating or lining being accomplished by trowel- or spray-application of said mass. For this purpose, particularly for spray-application, the consistency of the mass can be varied within wide limits by adding thinners, such as acetone.

The combination of the above mass with various other shield materials such as concrete, to form multi-layer bodies (slabs, plates or the like) can also be accomplished in a single process in a moulding press.

The composition according to the present invention or structural elements produced from said composition can be used in combination with known heavy materials impeding $\gamma$-radiation, such as iron, lead, haryte, heavy concrete and the like. Composite bodies obtained by such combination will produce efficient protection against all kinds of radiation emanating from explosion of atom bombs. Most effective protection will be provided by arranging the shielding material of the present invention on the outer surface of such composite bodies, i.e., on that surface which is obverse to the site of explosion. Such composite, multi-layer arrangement is much more efficient with respect to moderation and absorption than a shield of identical thickness consisting of a mixture of heavy concrete and borates.

By coating the surface of the outer layer of such composite body with a hydrogen-containing substance, such as paraffin or a synthetic resin, high-speed neutrons, the energy of which has already been decreased by the atmosphere between the site of explosion and the object, are further moderated. It is thus possible to reduce the thickness of the shields, which fact is of advantage from an economical point of view.

According to a further aspect of the present invention, the shield material obtained by mixing one or more of the above inorganic substances (lithium octoborate, lithium metaborate, substantially pure colemanite and substantially pure pandermite) with the synthetic resin, may be coated, either prior to or upon setting of said material, with neutron-moderating substances, such as synthetic resins, paraffin, or other compounds containing great amounts of carbon and hydrogen, in order to improve the moderating effect.

The mixture of the above inorganic substances with the synthetic resin may also be used as a cement or mortar for joining individual structural elements (slabs, plates, or the like) to form a protective structure or shelter. The joints of said structural elements are preferably rounded joints, halving joints, mitre joints, dovetail joints, or the like.

Protective structures or shelters constructed in accordance with the present invention and made of the shielding composition of the present invention provide protection particularly from long-range radiation originating from a source of radiation, e.g., the site of explosion of an atom bomb. Protection from the relatively short-lasting thermal action is afforded by concealed position, whereas subterranean position of a shelter, rigid concrete walls or metal casings provide sufficient protection from the pressure wave. Efficient protection from radiation is afforded by the shielding composition of the present invention, which is applied on the outer walls of a shelter. The present invention thus provides efficient protection of human beings against radiation at relatively low costs. Of particular importance is the protective action of the shield material according to the present invention against the high proportion of neutrons originating from H-bombs and neutron bombs.

The present invention will be further illustrated by the following examples.

EXAMPLE 1

74 parts by weight of lithium carbonate or 48 parts by weight of lithium hydroxide are molten together with 500 parts by weight of boric acid in a graphite crucible or in a free flame at 650° C. to form lithium octoborate. The melt is allowed to cool slowly, the resulting solid mass disintegrated to a grain size of less than 3 mm., any soluble portions of said mass are extracted with water, whereupon the residue is dried and graded. By said grading there is obtained a powdered portion of a fine grain size 0–0.1 mm., a portion of a medium grain size from 0.1–1.0 mm. and a portion of coarse grain size from 1–3 mm. 50 parts by weight of the portion of grain size from 1–3 mm., 14 parts by weight of the portion of grain size 0.1–1 mm., and 20 parts by weight of the powdered portion are thoroughly mixed with 1 part by weight of solid benzoyl peroxide, 14 parts by weight of a highly reactive, cold-setting polyester resin and 1 part by weight of calcium stearate to form an intimate mixture. Slabs of 500 x 500 x 20 mm. with rounded edges are formed from this mixture in a jar-ram moulding machine. If desired, one of the faces of said slabs (the rear surface) can be combined with a layer of heavy concrete about 230 mm. thick. The moulding of such composite body can be effected in a single procedure in said moulding machine.

The above slabs have a weight per unit of volume of about 2 g./ml., an absorption cross section of 18–20 cm.$^{-1}$ for thermal neutrons and an absorption cross section of 1.3–1.4 cm.$^{-1}$ for high-speed neutrons.

EXAMPLE 2

62 parts by weight of boric acid are dissolved in 300 parts by weight of hot water, the resulting solution being mixed with a solution of 42 parts by weight of the hydrate of lithium hydroxide (LiOH.H$_2$O) in 400 parts by weight of water. The resulting solution is concentrated, whereby the octohydrate of lithium metaborate (LiBO$_2$.8H$_2$O) is precipitated in the form of coarse crystals which are filtered off, dried, ground and graded to grain size of 1–3 mm. and 0–1 mm.

47 parts by weight of the portion of grain size 1–3 mm., 33 parts by weight of the portion of grain size 0–1 mm., 1.5 parts by weight of benzoyl peroxide, 1.5 parts by weight of calcium stearate and 17 parts by weight of a polyester resin are mixed and the resulting mixture is further processed as specified in Example 1. It is still very usable though less so than the mixture according to Example 1.

The specific weight of the slabs thus obtained is about 1.25 g./ml., the absorption cross section for thermal neutrons 2.7–2.9 cm.$^{-1}$ and that for high-speed neutrons 2.1–2.2 cm.$^{-1}$, which latter value, when compared with the respective cross section of paraffin (3.0 cm.$^{-1}$), can be considered as very high.

EXAMPLE 3

Colemanite or pandermite are disintegrated in a "Lösche" mill equipped with an air separator (wind sifter), the dust obtained thereby being either rejected or used for the production of boric acid. The resulting granular colemanite or pandermite is washed with water. The overall amount of the elements Si, Al, Fe, Mn and Na in the washed material should be below 1%. Upon drying at not more than 90° C., the material is further ground and the remaining iron is removed therefrom by magnetic separation. Particles under 3 mm. are removed by sifting, the remaining larger particles are ground in a ball mill to a size of less than 0.01 mm. (150 mesh) and the remaining iron is removed. To determine the weight per volume of the particles below 3 mm., they are filled into the desired mold without the addition of a binder and made as dense as possible, e.g. with the help of a vibration press.

The specific weight of colemanite or pandermite is 2.4 and from that and the weight per volume of the condensed particles in the mold one can calculate the remaining empty space. From the volume of empty space one can then deduct the volume of binder desired to be added. The amount of binder is selected according to the desired mechanical strength of the shield. The remaining volume is calculated as solid colemanite or pandermite and the corresponding weight is added in form of the fine portion that is of less than 0.01 mm. (150 mesh).

In this manner we may obtain for instance a mixture of 82.5 parts by weight of colemanite of a particle size of 0–3 mm. and 17.5 parts by weight of colemanite of a particle size of smaller than 0.1 mm.

As a rule of thumb it may be said that for colemanite and pandermite, using a comminuting process which yields a grain size of about 3 mm., the portion of grain size of 1 to 3 will amount to about 70%. The remaining 30% of a grain size below 1 mm. may be divided into two equal portions (that is 15% each) into the class of grain size 0.1–1 mm. and smaller than 0.1 mm.

The above described mixture thus corresponds to a composition consisting of about 58% of a coarse portion, 12% of a medium portion and 30% of a fine portion, which according to tests may be designated as an almost ideal mixture.

EXAMPLE 4

Instead of the 17.5 parts by weight of colemanite of a grain size of less than 0.1 mm., a similar amount of finely ground calcium borate is added. Some characteristic data of products thus obtained from colemanite are compiled in the table below.

Table

| Product | Slabs |
|---|---|
| Weight per unit of volume, g./ml. | 2.15–2.20 |
| Physical strength (kilopounds/cm.$^2$) | 400–800 |
| Absorption cross section for— | |
| Thermal neutrons, cm.$^{-1}$ | 10–12 |
| High-speed neutrons, cm.$^{-1}$ | 1.45–1.5 |

I claim:

1. In a method of producing a shielding material for protection against biologically damaging neutron radiation, the steps comprising mixing comminuted particles of at least one member of the group of substances consisting of lithium octoborate, lithium metaborate, purified colemanite and purified pandermite, said substances having less than 1% by weight of elements emitting secondary gamma radiation, with between about 10 to 25% by weight of a liquid synthetic resin of the thermosetting type to produce a formable mixture, said particles comprising about 50 to 70% by weight of a coarse portion of an average grain size of from about 1 to 3 mm. and about 30 to 50% by weight of a fine portion of an average grain size of from about 0.01 to 0.1 mm., moulding said mixture into the desired shape and allowing it to set, whereby a space distribution of said comminuted particles within said resin matrix is obtained which yields a shielding material of highest neutron-absorption cross section.

2. In a method, as claimed in claim 1, in which said comminuted particles contain less than 30% by weight of a medium portion of a grain size of from 0.1 to 1 mm.

3. In a method, as claimed in claim 1, in which said fine portion of a grain size of from about 0.01 to 0.1 mm. is replaced by calcium boride ($CaB_6$).

4. In a method, as claimed in claim 1, in which said colemanite has been purified to such an extent that the sum of foreign elements of silicon, aluminum, iron, manganese and sodium present in said purified colemanite is less than 1% by weight.

5. In a method, as claimed in claim 1, in which said pandermite has been purified to such an extent that the sum of foreign elements of silicon, aluminum, iron, manganese, and sodium present in said purified pandermite is less than 1% by weight.

6. In a mthod, as claimed in claim 1, in which said synthetic resin is a phenol-formaldehyde resin, precondensated by means of lithium hydroxide, said lithium hydroxide acting as the curing agent in the subsequent setting of said resin.

7. Shielding material for use in protection against biologically damaging neutron radiation, comprising a mixture of about 10 to 25% by weight of a synthetic resin of the thermosetting type with comminuted particles of at least one member of the group of substances consisting of lithium octoborate, lithium metaborate, purified colemanite and purified pandermite, said particles having less than 1% by weight of elements emitting secondary gamma radiation and containing about 50 to 70% by weight of a coarse portion of an average grain size of from about 1 to 3 mm. and about 30 to 50% by weight of a fine portion of an average grain size of from about 0.01 to 0.1 mm.

8. Shielding material, as claimed in claim 7, in which said comminuted particles contain less than 30% by weight of a medium portion of a grain size of from 0.1 to 1 mm.

9. Shielding material, as claimed in claim 7, in which said fine portion of an average grain size of from about 0.01 to 0.1 mm. is replaced by calcium boride ($CaB_6$).

10. Shielding material, as claimed in claim 7, in which said colemanite contains less than 1% by weight of foreign elements of silicon, aluminum, iron, manganese and sodium.

11. Shielding material, as claimed in claim 7, in which said pandermite contains less than 1% by weight of foreign elements of silicon, aluminum, iron, manganese and sodium.

12. Shielding material, as claimed in claim 7, in which said synthetic resin is a phenol-formaldehyde resin, precondensated and cured by means of lithium hydroxide.

13. Shielding material, as claimed in claim 7, comprising an additional layer of a heavy material capable of reducing the detrimental effects of gamma rays, said heavy material being selected from the group consisting of iron, lead, heavy spar and heavy concrete.

14. Shielding material, as claimed in claim 7, in which a coating layer containing at least one substance moderating fast neutrons is superimposed upon said shielding material, said moderating substance substantially consisting of a member of the group consisting of synthetic resins and paraffin.

15. Shielding material, as claimed in claim 14, in which said neutron-moderating coating layer and said shielding material penetrate each other.

16. Shielding material, as claimed in claim 7, in which said synthetic resin is selected from the group consisting of polyester resins and epoxy resins and wherein an organic catalyst has been used as the curing agent.

17. Building structures made from blocks of shielding material according to claim 7, said blocks being set with borate mortar, the joint between the blocks being non-linear, said mortar containing borates in the form of a compound selected from the group consisting of lithium octoborate, lithium metaborate, purified colemanite and purified pandermite, said compounds containing less than 1% by weight of elements emitting secondary gamma radiation.

References Cited
UNITED STATES PATENTS

| | | | |
|---|---|---|---|
| 2,726,339 | 12/1955 | Borst | 252—478 |
| 2,942,116 | 6/1960 | Axelrad | 252—478 |
| 3,092,590 | 6/1963 | Butler | 252—478 |
| 3,126,352 | 3/1964 | Blair et al. | 252—478 |

L. DEWAYNE RUTLEDGE, *Primary Examiner.*

BENJAMIN R. PADGETT, *Examiner.*

S. J. LECHERT, JR., *Assistant Examiner.*